United States Patent [19]
Buchholz et al.

[11] Patent Number: 5,943,456
[45] Date of Patent: Aug. 24, 1999

[54] COARSE WAVELENGTH DIVISION MULTIPLEXING OPTICAL SYSTEM

[75] Inventors: D. Bruce Buchholz, Woodridge; Charles Calvin Byers, Aurora, both of Ill.

[73] Assignee: Lucent Technologies Inc., Murray Hill, N.J.

[21] Appl. No.: 08/915,244

[22] Filed: Aug. 20, 1997

[51] Int. Cl.⁶ .................................................. G02B 6/28
[52] U.S. Cl. .............................. 385/24; 385/16; 385/17; 359/109; 359/111
[58] Field of Search ................. 385/24, 16–23; 359/111, 114, 115, 109

[56] References Cited

U.S. PATENT DOCUMENTS

| | | | |
|---|---|---|---|
| 4,943,136 | 7/1990 | Popoff | 385/24 |
| 5,345,524 | 9/1994 | Lebby et al. | 385/88 |
| 5,568,575 | 10/1996 | Sato | 35/16 |
| 5,745,270 | 4/1998 | Koch | 385/24 X |

FOREIGN PATENT DOCUMENTS

| | | |
|---|---|---|
| 0636908 | 2/1995 | European Pat. Off. . |
| 0645651 | 3/1995 | European Pat. Off. . |
| 60-067907 | 4/1985 | Japan . |
| 62159105 | 4/1985 | Japan . |

*Primary Examiner*—Phan T. H. Palmer
*Attorney, Agent, or Firm*—Jack R. Penrod; Dennis J. Williamson

[57] ABSTRACT

A substrate is provided that supports a laser array chip positioned such that the light streams emanating from the laser array are parallel to and substantially coplanar with the surface of the substrate. A plurality of apertures are formed in the substrate between the light streams for receiving a photodiode array chip. The photodiode array chip is formed as a comb-like structure where the "teeth" of the comb are aligned with and fit into the apertures formed in the substrate such that the photodiode array chip is supported perpendicular to the substrate. Located on each of the teeth of the photodiode array chip is a photodiode. The photodiodes are arranged such that when the photodiode array chip is inserted into the substrate the photodiodes are substantially coplanar with the surface of the substrate. Using such a construction, the light streams emanating from the lasers on the laser array chip are interdigitated with and coplanar with the photodiodes. Fibers or waveguides in the substrate connect to the lasers and photodiodes and extend parallel to and coplanar with one another such that adjacent fibers or waveguides can be simply connected to the inputs of a CWDM coupler. The optical module of the invention can be mounted on an interface card to provide high density line cards required in fiber based telecommunications networks.

25 Claims, 2 Drawing Sheets

COARSE WAVELENGTH DIVISION MULTIPLEXING OPTICAL SYSTEM

BACKGROUND OF THE INVENTION

The invention relates, generally, to bidirectional optical interfaces and, more particularly, to a device for arranging an array of coarse wavelength division multiplexing (CWDM) optical systems in a single, compact and inexpensive device.

It will be appreciated that bidirectional fiber optic transmission systems are an emerging technology for telecommunication networks, backplanes in computers, transmission and sensor technologies and other similar systems. To provide bi-directional flow, a number of solutions exist. One known technology uses a pair of fibers between the endpoints where each fiber carries traffic in one direction. While the use of dual fibers is technologically simple, in certain applications the cost of installing and maintaining dual fibers is prohibitive. As an alternative to the dual fiber solution, a number of single fiber technologies exist for providing a point to point link. One such technology is coarse wavelength division multiplexing (CWDM) in which different wavelengths of light are used to transport data streams over the same optical fiber in opposite directions.

As will be appreciated, in CWDM technology, light of a first wavelength is generated by a laser at a first end of a fiber optic link and is received by a photodiode at a second end of the link, light of a second wavelength is generated by a laser at the second end of the same link and received by a photodiode at the first end of the link. The problem exists that the different wavelengths of light must be combined and split at the endpoints of the fiber optic link. The CWDM couplers that combine and split the light at the endpoints use technology such as fibers bent to critical radii, ball lenses, wavelength selective gratings and the like. All of these technologies require that the light paths emanating from the lasers and the light paths entering the photodiodes must be on adjacent paths. Because the lasers and photodiodes require different semiconductor processes and materials, they cannot both be integrated on the same substrate; therefore, separate integrated circuit chips are required for the lasers and photodiodes. In systems in which a laser array having multiple light paths and a photodiode array also having multiple light paths are used, it is topologically impossible to use standard array lasers, array photodiodes and existing CWDM couplers because current technology does not permit the creation of optical crossovers allowing the adjacent alternating light paths required by the couplers.

Telecommunication network architectures are being developed for providing optical fiber to the customer premise. Typically, fiber links extend between interface cards in a network element such as an optical network unit, switching system or the like and the customer premise. To be cost effective and to support the traffic requirements of a typical network, each interface card should optimally support a minimum of 12 to 24 channels. The use of two fibers, one handling traffic in the upstream direction and one handling traffic in the downstream directions, is prohibitively expensive in such systems because the fiber link is typically on the order of 10,000 meters in length. CWDM technology offers a viable alternative for providing the high density line cards; however a cost effective and compact system for splitting and combining the different wavelengths of light where laser arrays and photodiode arrays are used on the limited space of a line card (a line card being approximately 12×8 inches) has not been developed.

In an effort to provide arrays of CWDM data streams, two approaches are known. The first approach uses a single CWDM device that includes the lasers, photodiodes and an CWDM optical splitter system on a single device. This device is relatively robust and has a reasonable level of integration but is relatively large (i.e. 3×4 inches) and relies on an expensive optical splitter system. Thus, arranging 24 such integrated systems on the limited area of a line card presents physical design problems. The second approach uses a packaged array of twelve photodiodes, a separate packaged array of twelve lasers, and a separate packaged array of twelve CWDM optical splitter systems. This system reduces the component count over the integrated device design but requires fiber ribbons between the laser, diodes and splitters that are difficult to manage and also present physical design problems.

Thus, an array of CWDM optical systems on a single, compact and inexpensive device that has particular use on a line card in a fiber-based telecommunications network is desired.

SUMMARY OF THE INVENTION

A substrate is provided that supports a packaged laser array chip positioned such that the light streams emanating from the laser array are parallel to and substantially coplanar with the surface of the substrate. A plurality of apertures for receiving a photodiode array chip are formed in the substrate between the light streams emanating from the lasers. The packaged photodiode array chip is formed as a comb-like structure where the "teeth" of the comb are aligned with and fit into the apertures formed in the substrate such that the photodiode array chip is supported perpendicular to the substrate. Located on each of the teeth of the photodiode array chip is a photodiode. The photodiodes are arranged such that when the photodiode array chip is inserted into the substrate, the photodiodes are substantially coplanar with the surface of the substrate. Using such a construction, the light streams emanating from the lasers on the laser array chip are interdigitated with and coplanar with the photodiodes. Fibers placed on or waveguides located in the substrate connect to the lasers and photodiodes and extend parallel to and coplanar with one another such that adjacent fibers or waveguides can be simply connected to the inputs of a CWDM coupler. Because the unique configuration of the CWDM optical module allows the laser and photodiodes to be coplanar and interdigitated, standard inexpensive and relatively small CWDM couplers can be used. The resulting CWDM optical module is inexpensive and relatively small when compared to existing technologies. As a result, the optical module of the invention can be easily mounted on or integrated into an interface card to provide the 24 channels required in fiber based telecommunications networks.

DETAILED DESCRIPTION OF THE INVENTION

Figure 1:
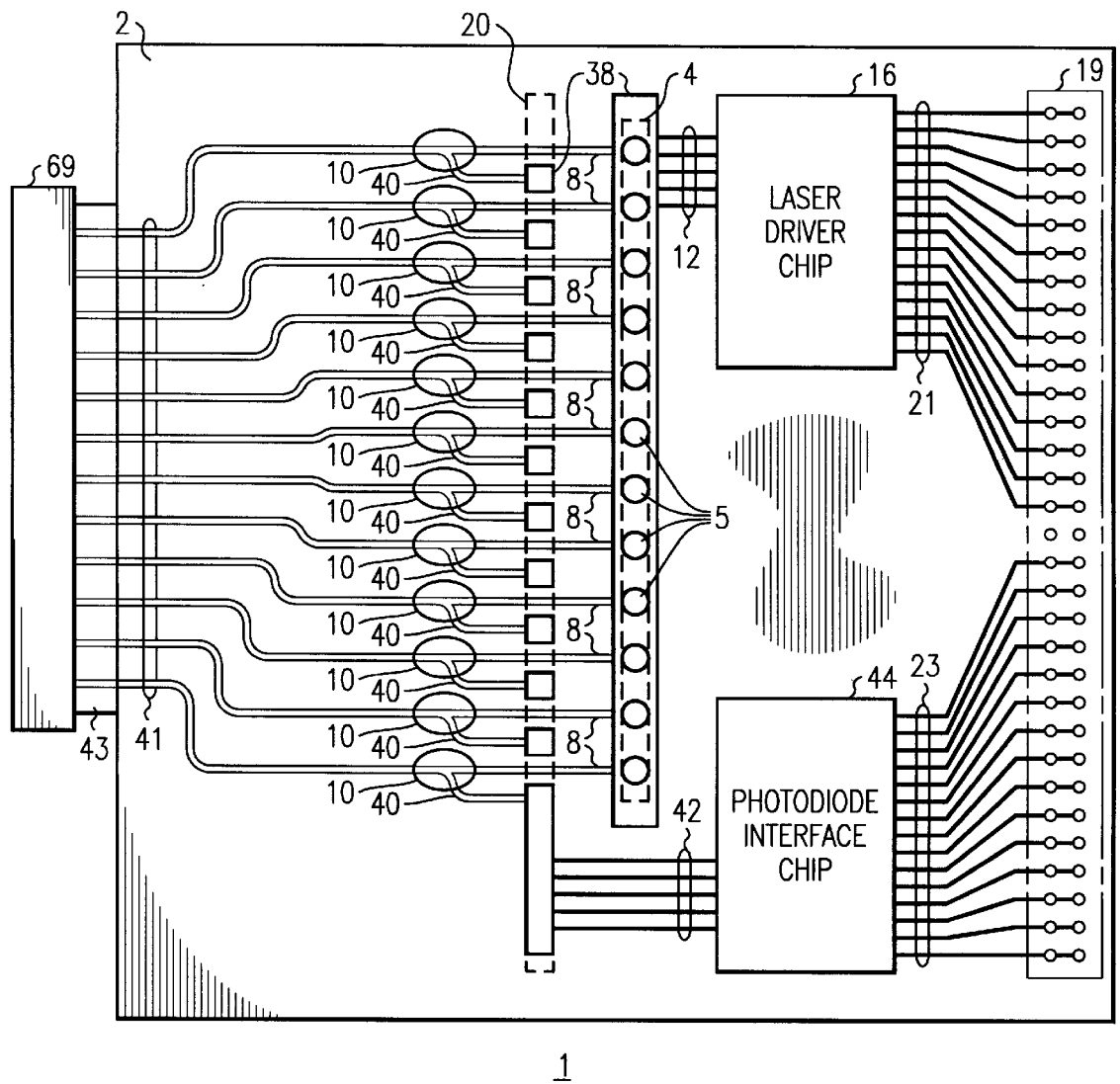
FIG. 1 shows a plan view of the optical module of the invention.

Referring more particularly to FIG. 1, the optical module 1 of the invention consists of a semiconductor, ceramic or plastic substrate 2. Mounted to the substrate is a packaged laser array chip 4. Laser array chip 4 consists of a plurality of surface or edge emitting lasers 5 operating at a predetermined wavelength such as 1310 nm. Laser array 4 is positioned in substrate 2 such that the streams of light that are emitted from the lasers 5 are parallel to and located substantially at the surface of substrate 2. To arrange the lasers at the surface of substrate 2, it may be necessary to photochemically or mechanically mill a hole in substrate 2 to receive the laser array 4. Depending upon the configuration and dimensions of the laser array 4, it may not be necessary for the hole to extend completely through substrate 2, in which case the hole may consist of a milled depression in the surface of substrate 2. Once the laser array 4 is properly aligned, it is bonded to the substrate 2. Transmission elements 8 consisting of optical waveguides located within substrate 2 or fibers placed on substrate 2 connect each of the lasers 5 to the inputs of CWDM splitters 10. Electrical conductors 12 connect the lasers 5 of laser array 4 to controlling electrical elements such as a laser driver chip 16, framers or the like. These electrical elements are connected to the module's electrical connector 19 by conductors 21. Although the electrical elements are shown as being integrated onto the substrate 2, they can be located off of substrate 2 and on an associated device such as a line card circuit board if desired.

Figure 2:
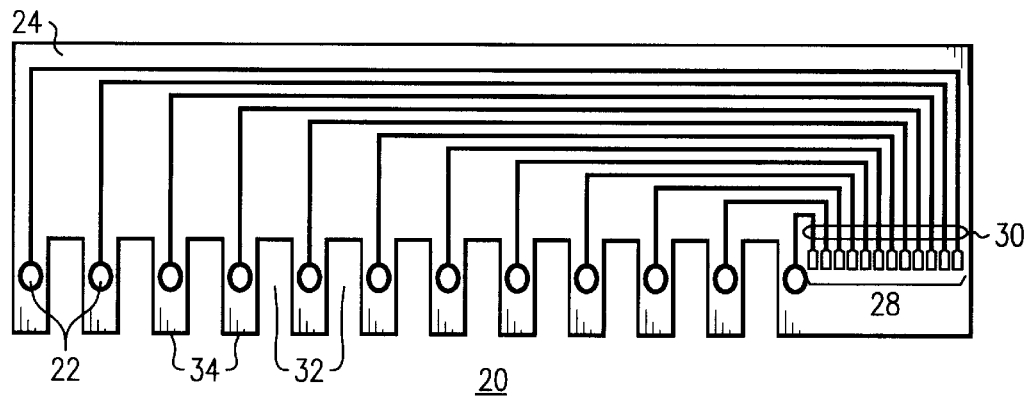
FIG. 2 shows a front view of the photodiode array chip of the invention.

Referring to FIG. 2, a photodiode array 20 is shown consisting of a plurality of photodiodes 22 operating at a predetermined wavelength such as 1550 nm arranged in a row along one edge of chip 24. In the preferred embodiment, the number of photodiodes is equal to the number of lasers on laser array 4. Photodiodes 22 are connected to bonding pads 28 via conductors 30. Slots 32 are milled in the edge of chip 24 between the photodiodes 22 to create teeth or extending members 34 such that photodiode array 20 has a comb-like structure where the photodiodes are disposed in the teeth 34 of the "comb."

Referring again to FIG. 1, substrate 2 includes a plurality of mechanically or chemically milled apertures 38 for receiving the teeth 34 of photodiode array 20. Photodiode array 20 is inserted into substrate 2 such that teeth 34 extend into apertures 38 and are positioned such that the photodiodes 22 are disposed at the level of substrate 2 aligned with waveguides or fibers 40. Waveguides or fibers 40 extend to another input of CWDM couplers 10. Slots 32 of photodiode array 20 extend over and bridge the waveguides or fibers 8 emanating from lasers 5. Once the photodiode array 20 is properly aligned in substrate 2, it is bonded to the substrate. Bonding pads 28 are connected to conductors 42 that are connected to electrical elements such as photodiode preamplifier decision circuits 44, clock recovery circuits, framers or the like. The electrical elements 44 are connected to the module electrical connector 19 by conductors 23. Although the electrical elements are shown as being integrated onto the substrate 2, they can be located off of substrate 2 and on an associated device such as a line card circuit board if desired.

CWDM couplers 10 function to combine and split the light as the light is transmitted between the separate fibers leading to the lasers 5 and photodiodes 22 and the single fibers 41 carrying the combined traffic from the optical module of the invention to the opposite end of the fiber link. The optical fibers or waveguides 41 are connected to an optical fiber ribbon 43 for transmitting the combined upstream and downstream traffic between the link endpoints.

Figure 3:
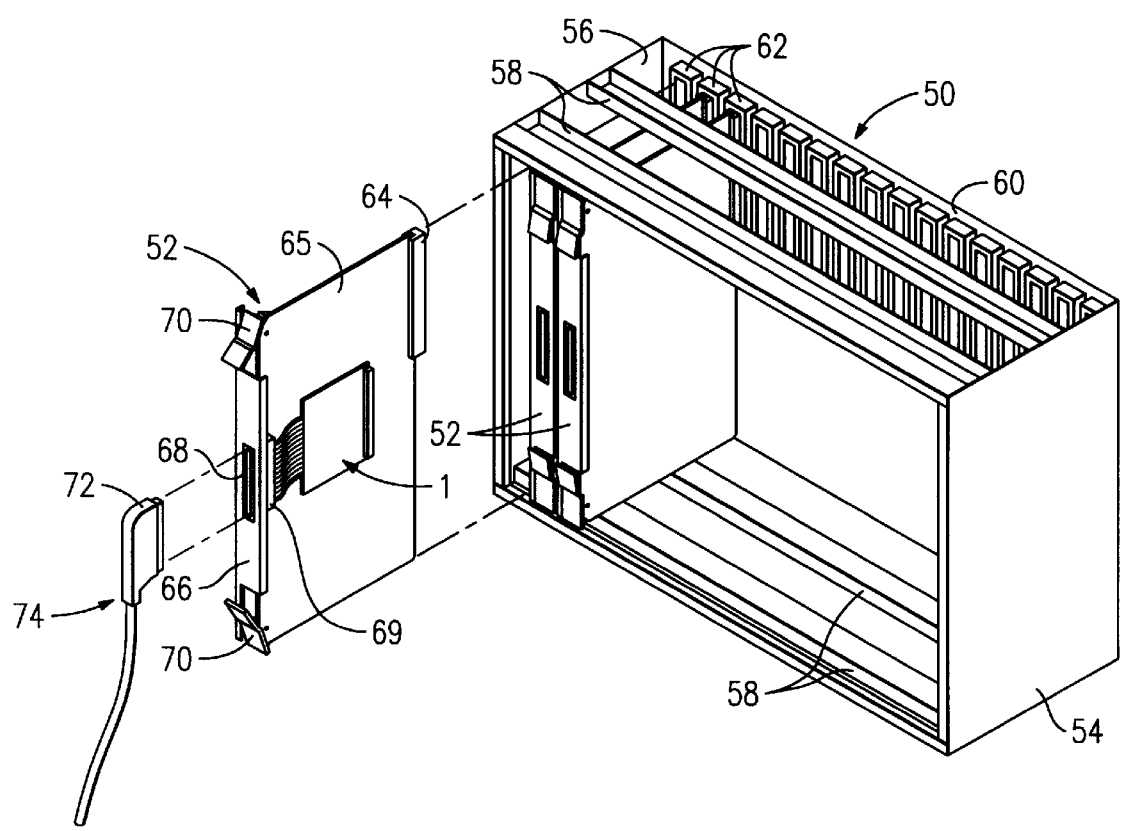
FIG. 3 shows a schematic view of a telecommunications element including a line card incorporating the optical module of the invention.

In one preferred embodiment, the optical module 1 is connected to a line card for use in a network element such as a switching system in a telecommunications network for providing fiber to the customer. Referring more particularly to FIG. 3, a typical subrack or shelf 50 and interface units such as line cards 52 for a switching system or other network element are shown. While specific reference is made to line cards 52, is to be understood that the optical module of the invention also can be used on trunk cards, other interface cards or other elements. Subrack 50 consists of side plates 54 and 56 and backplate 60 including electrical connectors 62, one connector 62 being provided for each of the line cards 52. Connectors 62 releasably engage connectors 64 on the line cards 52 to allow communication between the line card and the switching system or other network element. Line cards 52 consist of a circuit pack 65 having circuitry for controlling the lines hosted by that line card. A face place 66 is connected to the side of the circuit pack opposite to connector 64. Face plate 66 includes an aperture 68 through which the plug 72 of cable assembly 74 can access an optical connector 69 on the line card. In operation, the line card 52 is inserted into subrack 50 so that connector 64 engages the backplane connector 62 and latches 69 engage supports 58. Plug 72 is inserted through aperture 68 into engagement with the pin connectors to complete the physical installation of the line card. Cable assembly 74 provides a connection to the optical fibers that extends to the customer premise or other network element. Thus, line card 52 interfaces between the fiber transmission elements to the customer premise and the switching system or other network element hosting the line card as is generally known in the art. The optical module of the invention 1 is mounted on circuit pack 65 such that the optical waveguides or fibers extending from CWDM splitters terminate at optical connector 69. Note that while a fiber ribbon is shown in the illustrated embodiment, it is contemplated that the waveguides or placed fibers could be connected directly to connector 69 or that other transmission techniques could be used. When cable assembly 74 is connected to connector 69, the optical module 1 communicates with downstream network elements such a customer premise equipment. The optical module's electrical connector 19 is electrically connected to the electronics on circuit pack 65 such that when circuit pack 65 is inserted in network element, the optical module 1 is in communication with the network element. It should be noted that the electronics such as the laser chip driver and photodiode interface chip can be located on circuit pack 65 rather than on the optical module 1. Because the optical module of the invention is relatively small, compact, and inexpensive it can be used to create high density interface cards. For example, to provide 24 channels, two of the 12 channel modules described with reference to FIGS. 1 and 2 are used. It will be appreciated that the number of channels provided and the number of modules used to provide those channels are a matter of engineering design choice. Moreover, because of its simple design, it eliminates the physical design problems of the prior art. The "comb" structure of the photodiode array allows the interdigitation of the photodiodes and lasers thereby greatly simplifying the construction of the CWDM couplers and eliminating the need for complex transmission arrangements. While the invention has been described with the photodiodes on the "comb" structure, it is to be understood that the photodiode array could be mounted to the substrate in place of the laser array and the lasers mounted on a "comb" shaped array such that the relative positions of the lasers and photodiodes are reversed from that in the illustrated example.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. An optical interface device, comprising:
   a first substrate supporting a plurality of light emitting means;
   first transmission means for connecting said light emitting means to a plurality of optical couplers;
   a second substrate supporting a plurality of light receiving means, said second substrate being mounted to said first substrate such that said plurality of light emitting means are interdigitated with said plurality of light receiving means; and
   second transmission means for connecting said light receiving means to said plurality of optical couplers.

2. The device of claim 1, wherein said second substrate includes a plurality of slots formed along one side thereof to create a plurality of extending members, one of said plurality of light receiving means disposed in each of said extending members, said second substrate being mounted to said first substrate such that the extending members are located between said light emitting means.

3. The device of claim 2, wherein said first substrate includes portions forming a plurality of apertures, said apertures being located between said light emitting means and receiving said extending members.

4. The device of claim 1, wherein said first transmission means comprises a plurality of optical waveguides formed in the first substrate.

5. The device of claim 1, wherein said first transmission means comprises a plurality of fibers placed on the first substrate.

6. The device of claim 1, wherein said second transmission means comprises another plurality of optical waveguides formed in the first substrate.

7. The device of claim 1, wherein said second transmission means comprises another plurality of fibers placed in the first substrate.

8. The device of claim 1, wherein said first transmission means comprises a plurality of fibers placed on the first substrate and said second transmission means comprises another plurality of fibers placed the first substrate interdigitated with said plurality of fibers.

9. The device of claim 1, wherein said first transmission means comprises a plurality of waveguides formed in the first substrate and said second transmission means comprises another plurality of waveguides formed in the first substrate interdigitated with said plurality of waveguides.

10. The device of claim 1, where said light emitting means comprises a laser.

11. The device of claim 1, wherein said light receiving means comprises a photodiode.

12. The device of claim 1, further including a third transmission means connected to said optical coupler for carrying combined light from said light emitting means and light to said light receiving means.

13. The device of claim 1, said first substrate being mounted to a line card in a telecommunications network element.

14. The device of claim 1, wherein said first transmission means comprises a plurality of fibers located between an optical connector and the first substrate.

15. The device of claim 1, wherein said first transmission means is located between an optical connector and the first substrate.

16. An optical interface device, comprising:
    a first substrate supporting a plurality of light receiving means;
    first transmission means for connecting said light receiving means to a plurality of optical couplers;
    a second substrate supporting a plurality of light emitting means, said second substrate being mounted to said first substrate such that said plurality of light receiving means are interdigitated with said plurality of light emitting means; and
    second transmission means for connecting said light emitting means to said plurality of optical couplers.

17. The device of claim 16, wherein said second substrate includes a plurality of slots formed along one side thereof to create a plurality of extending members, one of said plurality of light emitting means disposed in each of said extending members, said second substrate being mounted to said first substrate such that the extending members are located between said light receiving means.

18. The device of claim 17, wherein said first substrate includes portions forming a plurality of apertures, said apertures being located between said light receiving means and receiving said extending members.

19. An optical interface device, comprising:
    a first substrate supporting a plurality of lasers;
    first transmission means for connecting said lasers to a plurality of optical couplers;
    a second substrate supporting a plurality of photodiodes, said second substrate being mounted to said first substrate such that said plurality of lasers are interdigitated with said second plurality of photodiodes; and
    second transmission means for connecting said photodiodes to said plurality of optical couplers.

20. The device of claim 19, wherein said second substrate includes a plurality of slots formed along one side thereof to create a plurality of extending members, one of said plurality of photodiodes disposed in each of said extending members, said second substrate being mounted to said first substrate such that the extending members are located between said lasers.

21. The device of claim 20, wherein said first substrate includes portions forming a plurality of apertures, said apertures being located between said lasers and receiving said extending members.

22. An optical interface device, comprising:
    a first substrate supporting a plurality of photodiodes;
    first transmission means for connecting said photodiodes to a plurality of optical couplers;
    a second substrate supporting a plurality of lasers, said second substrate being mounted to said first substrate such that said plurality of photodiodes are interdigitated with said plurality of lasers; and
    second transmission means for connecting said lasers to said plurality of optical couplers.

23. The device of claim 22, wherein said second substrate includes a plurality of slots formed along one side thereof to create a plurality of extending members, one of said plurality of lasers disposed in each of said extending members, said second substrate being mounted to said first substrate such that the extending members are located between said photodiodes.

24. The device of claim 23, wherein said first substrate includes portions forming a plurality of apertures, said apertures being located between said photodiodes and receiving said extending members.

25. An interface card for use in a telecommunications network element, comprising:

a circuit pack;

an optical interface module mounted to said circuit pack comprising:

a first substrate supporting a plurality of light emitting means;

first transmission means for connecting said light emitting means to a plurality of optical couplers;

a second substrate supporting a plurality of light receiving means, said second substrate being mounted to said first substrate such that said plurality of light emitting means are interdigitated with said plurality of light receiving means; and second transmission means for connecting said light receiving means to said plurality of optical couplers.

* * * * *

UNITED STATES PATENT AND TRADEMARK OFFICE
CERTIFICATE OF CORRECTION

PATENT NO. : 5,943,456
DATED : August 24, 1999
INVENTOR(S) : D. Bruce Buchholz, Charles Calvin Byers It is certified that error appears in the above-identified patent and that said Letters Patent is hereby corrected as shown below:

Column 6, claim 19, line 32, delete "second".

Signed and Sealed this

Sixteenth Day of May, 2000

*Attest:*

Q. TODD DICKINSON

*Attesting Officer*          *Director of Patents and Trademarks*